United States Patent Office 2,923,669
Patented Feb. 2, 1960

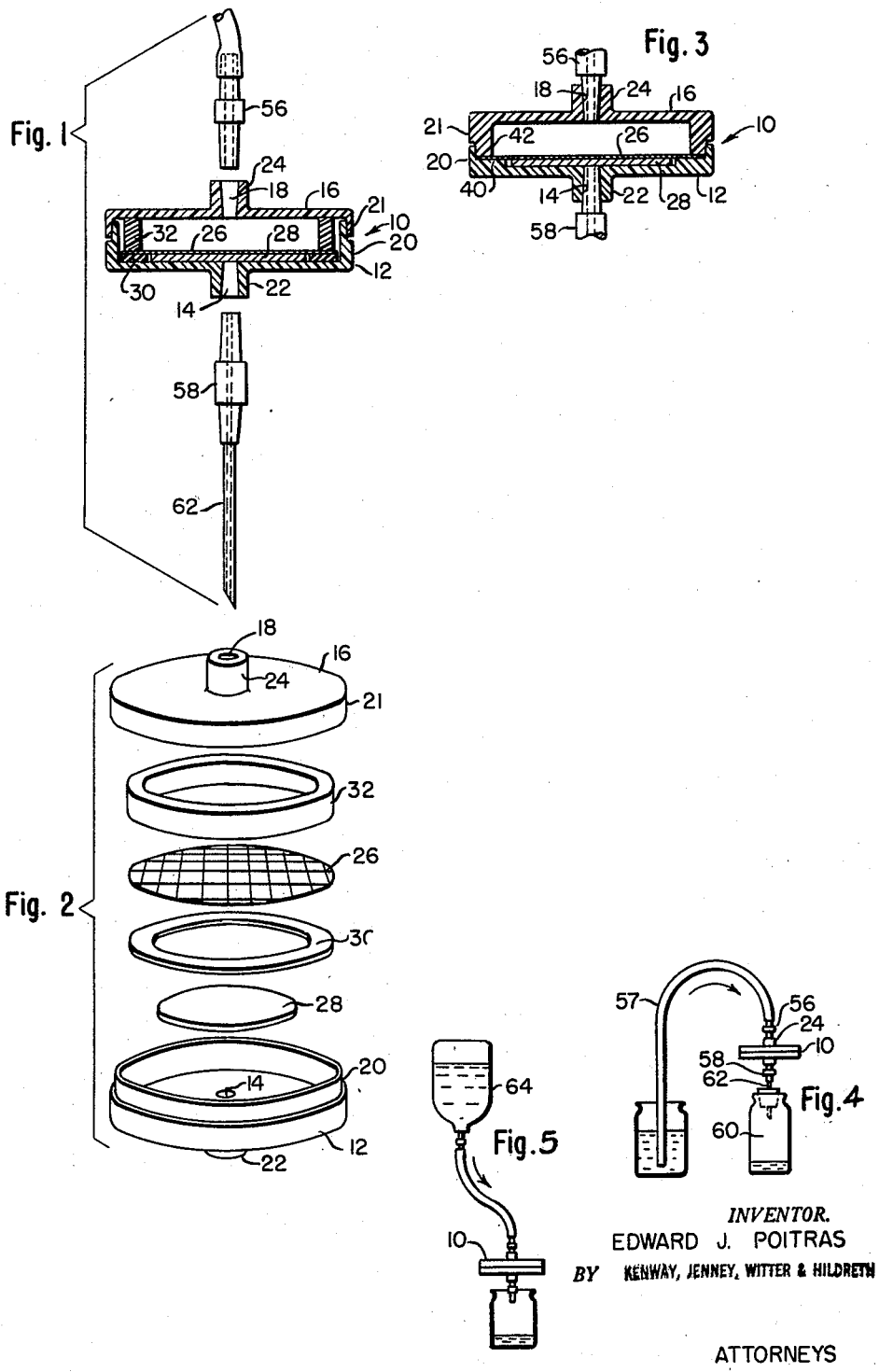

2,923,669

METHOD OF BACTERIAL ANALYSIS

Edward J. Poitras, Holliston, Mass., assignor to Millipore Filter Corporation, a corporation of Massachusetts Original application November 22, 1954, Serial No. 470,169, now Patent No. 2,879,207, dated March 24, 1959. Divided and this application April 8, 1958, Serial No. 727,210

4 Claims. (Cl. 195—103.5)

The present invention comprises a novel method of bacterial analysis whereby a sample to be analyzed may be filtered to collect the micro-organisms present, the culture medium added, and the organisms incubated, all without manipulating the filter or otherwise exposing it to possible contamination.

An important use of the bacterial analysis method of this invention is in public health work where it is frequently necessary to test water sources in the field rapidly and efficiently to determine their safety. It has been the practice in testing water to collect liter samples in sealed containers, then to refrigerate them and transport them to a laboratory where they are filtered and the bacteria are cultured. A recent improvement consists in utilizing small plastic hermetically sealed dishes in conjunction with portable filtering apparatus whereby filtration of the samples is carried out in the field and the filter membrane then placed and sealed in the dish. Conveniently the dish is provided with a supporting pad for the filter saturated with a nutrient medium so that incubation may proceed during the time the sample is in transit to its final examination. A disadvantage of this technique, however, is the possibility of contaminating the filter with extraneous organisms, particularly when the field work is under relatively septic conditions. Also, most suitable filter materials are quite fragile and delicate and their transfer from the filter apparatus to the dishes requires considerable care, particularly if an underlying pad of nutrient medium is provided against which the filter must make complete face to face contact.

The bacterial analysis method of this invention avoids the difficulties encountered in previous techniques by utilizing a container adapted for both filtration and incubation of microorganism specimens. The invention thus eliminates all need for any manipulation of the filter, avoids any danger of extraneous contamination, and obviates the necessity of using separate filtering apparatus. In use a sample to be analyzed is flowed through the unit, and the nutrient medium is then introduced and the unit sealed preparatory to incubation which is carried out in the sealed unit.

In general, the method makes use of a bacterial analysis unit which comprises an enclosed container, conveniently in the form of a flat circular box, having a bottom and top each tapped to provide for the introduction of the sample and removal of the filtrate through suitable connections. Against the bottom of the box is a porous supporting pad, or other supporting structure providing drainage, on which rests a filter film held in place in face-to-face contact with the supporting pad by an annular member engaging the top surface of the film at its marginal edges. When assembled, and prior to use, the inlet and outlet taps in the bottom and top are preferably sealed, and the unit may then be sterilizde and stored in a sterile condition until ready for use.

With a unit of this construction, the sample to be tested is passed, by suitable connections, through the inlet in the top, and drained from the outlet in the bottom. In passing through the unit the micro-organisms originally present in the sample are filtered out and collected on the filter. They may then be cultured by introducing a culture medium through either the outlet port or inlet port to saturate the porous supporting pad and feed the overlying filter film. The inlet and outlet ports are then sealed and the unit is ready for incubation.

The filter film is preferably a microporous membrane suitable for removing bacteria and other micro-organisms and retaining them on the outer surface. A satisfactory filter film is described in U.S. Patent No. 1,421,341, issued June 27, 1922, as being made by dissolving a cellulose ester in a solvent and evaporating the solution to dryness in a humid atmosphere. Suitable materials are now commercially available, for instance Millipore Filters sold by the Millipore Filter Corporation, Watertown, Massachusetts. Other filter materials suitable for removing micro-organisms are also satisfactory.

From the foregoing general description, it will be appreciated that this invention is adapted to numerous embodiments. Of these, preferred embodiments selected for purposes of illustration are described in detail below with reference to the accompanying drawings in which:

Fig. 1 is a cross-sectional elevation of one embodiment of apparatus useful in this invention showing also appropriate connections for introducing and removing samples to be tested;

Fig. 2 shows the parts of the embodiment in Fig. 1 in exploded relation;

Fig. 3 is a cross-sectional elevation of another embodiment of this invention; and Figs. 4 and 5 are schematic diagrams suggestive of preferred methods of using the bacterial analysis unit of this invention.

In the embodiment shown in Fig. 1 and 2 the container 10 consists of a bottom tray 12 centrally tapped to provide an outlet port 14, and a removable close fitting close fitting cover 16 centrally tapped to provide an inlet port 18. Conveniently, the bottom tray 12 and cover 16 are formed with side wall sections 20—21 correspondingly tapered to provide a rather rigid and close fit. The outlet and inlet ports 14 and 18 are preferably formed as inwardly tapering bores in outer collars 22 and 24 which serve to facilitate the making of appropriate connections to the ports and to strengthen the structure. Conveniently, the cover 16 and bottom tray 12 are formed of a transparent plastic, such as polystyrene with the top of the cover 16 smooth and flat to permit visual observation of the interior, and in general the preferred container is constructed as described in U.S. Patent No. 2,677,647.

The filter film 26 is supported on the bottom tray 12 by a porous supporting pad 28, conveniently a circular piece of thick filter paper or felt which serves to provide drainage from the entire area beneath the film 26 to the outlet port 14, and serves also as a bibulous structure for absorbing nutrient medium for culturing micro-organisms collected on the filter film.

The filter film 26 is conveniently held in place by an underlying resilient gasket ring 30, of for instance polychloroprene, surrounding the pad 28 and supporting the lower marginal edge of the film, and a cooperating frame 32 engaging the upper marginal edge of the film and extending upward into contact with the cover 16. The filter film 26 is thus held in assured contact with the supporting pad with the frame 32 providing side walls defining the filter area. Alternatively, however, the supporting pad may extend to the edges of the film 26 and provide the necessary support against which the frame presses the upper edges of the film.

In Fig. 3 is shown a modified embodiment in which the lower marginal edges of the filter film 26 are supported on a raised shoulder 40 formed as an integral part of the bottom tray 12, and the upper marginal edges are engaged by a downwardly extending flange 42 formed as an integral part of the cover 16. In this embodiment the flange 42 also serves as part of the side wall construction of the cover engaging the side wall 20 of the bottom tray 12, and these may also be correspondingly tapered to assure a tight fit.

For field work it may be desired that the container be more positively sealed than by the friction fit of the bottom tray 12 and cover 16, and for this purpose a band of pressure sensitive adhesive tape, e.g. a vinyl or cellulose tape, may be wrapped around the side walls 20—21 to prevent any possible opening and contamination of the unit.

In using the bacterial analysis unit of this invention to provide bacterial cultures of samples tested, connections to the inlet and outlet ports 18 and 14 are conveniently made by tubular tapered fittings 56 and 58 of polyethylene or other material suitable for insuring a tight connection, inserted into the ports. A convenient technique for taking water samples, as suggested by Fig. 4, consists in connecting a tube 57 through a fitting 56 to the inlet port collar 24 and immersing the other end of the tube in the water to be tested. The outlet fitting 58 is then connected to a source of vacuum, to draw the sample through the unit and then to drain the unit, after which the fittings are removed, and a quantity of a culture medium necessary to saturate the supporting pad is introduced, as by a syringe, through the outlet port 14, the ports are then sealed preliminary to incubation as by plugs 51 or pieces of pressure sensitive adhesive tape. A convenient means of applying the vacuum, particularly in field work, utilizes an evacuated bottle 60 (Fig. 4) having a soft rubber stopper which is penetrated by a hollow needle 62 connected to the outlet fitting 58.

Alternatively, a sample may be filtered by placing it in a soft flexible container 64 of e.g. rubber or polyethylene, which is connected to the inlet port 18, and squeezing the container to force the sample through the unit, as suggested by Fig. 5. In this procedure, no connection to the outlet port 14 is required.

After the sample of micro-organisms has been collected on the filter film, a conventional liquid nutrient medium may be introduced through either the inlet or outlet ports 18 or 14 to saturate the pad 28, the inlet and outlet ports are then sealed, as by a pressure sensitive tape or a plug, and the unit is placed in incubation.

The unit of this invention is adapted to numerous bacteriological analysis techniques. For instance, it may be used for the culture of both aerobic and anaerobic organisms. With aerobic organisms it is only necessary that the capacity of the container 10 between the filter film 26 and cover 16 be sufficient that the required amount of air will be present when the container is sealed. Where anaerobic organisms are to be grown, the unit may be flushed with nitrogen or carbon dioxide to remove the air, and then sealed. The unit may also be used advantageously with techniques requiring two or more successive culture media, for instance, it is frequent practice to employ first an enrichment medium, and then a differential medium, and this may be done by draining off the enrichment medium after incubation thereon, as by opening the inlet and outlet ports and applying a vacuum to the latter while applying sterile air or other gas to the inlet, then introducing the differential medium in the ordinary manner.

It will be understood that the foregoing description is by way of illustration and that numerous modifications of the construction and utilization of the bacterial analysis unit readily occurring to those skilled in the art may be made without departing from the scope of this invention.

This application is a division of applicant's co-pending application Serial No. 470,169 filed November 22, 1954, now Patent No. 2,879,207.

Having thus disclosed this invention and described in detail preferred embodiments thereof, I claim and desire to secure by Letters Patent:

1. The method of assaying for biological specimens comprising providing an enclosed container having a drainage port and an inlet port and filter film adapted to remove micro-organisms mounted in said container on a porous supporting pad overlying the drainage port, introducing a fluid to be assayed into the inlet port and draining said fluid from the outlet port to cause said fluid to flow through said filter film, thereby collecting biological specimens on the surface of said filter film, impregnating said supporting pad with a nutrient medium while said filter film is mounted thereon, closing said container, and incubating the specimens collected.

2. The method of assaying for biological specimens comprising providing a filter film adapted to remove micro-organisms mounted on a porous supporting pad, flowing a fluid to be assayed through said filter film to collect biological specimens on the unsupported surface thereof, impregnating said supporting pad with a nutrient medium while said filter film is mounted thereon, enclosing said pad and film in a container, and incubating the specimens collected.

3. The method of assaying for biological specimens comprising providing an enclosed container having a bottom tapped to provide a drainage port and a top tapped to provide an inlet port and a filter film adapted to remove micro-organisms mounted in said container on a porous supporting pad overlying the drainage port, introducing a fluid to be assayed into the inlet port and draining said fluid from the outlet port to flow said fluid through the filter film, thereby collecting biological specimens on said filter film, introducing a nutrient medium through one of said ports to impregnate said supporting pad therewith, closing the inlet port and the outlet port, and incubating the specimens collected.

4. The method of assaying for biological specimens comprising providing an enclosed container having a bottom tapped to provide a drainage port and a top tapped to provide an inlet port and a filter film adapted to remove micro-organisms mounted in said container on a porous supporting pad overlying the drainage port, introducing a fluid to be assayed into the inlet port and draining said fluid from the outlet port to flow said fluid through the filter film, thereby collecting biological specimens on said filter film, introducing a nutrient medium through said outlet port to impregnate said supporting pad therewith, closing the inlet port and the outlet port, and incubating the specimens collected.

References Cited in the file of this patent

UNITED STATES PATENTS

| | | |
|---|---|---|
| 2,672,431 | Goetz | Mar. 16, 1954 |
| 2,677,646 | Lovell | May 5, 1954 |

OTHER REFERENCES

Journal of The Water Works Association, 45, November 11, 1953, pp. 1196–1210.